UNITED STATES PATENT OFFICE.

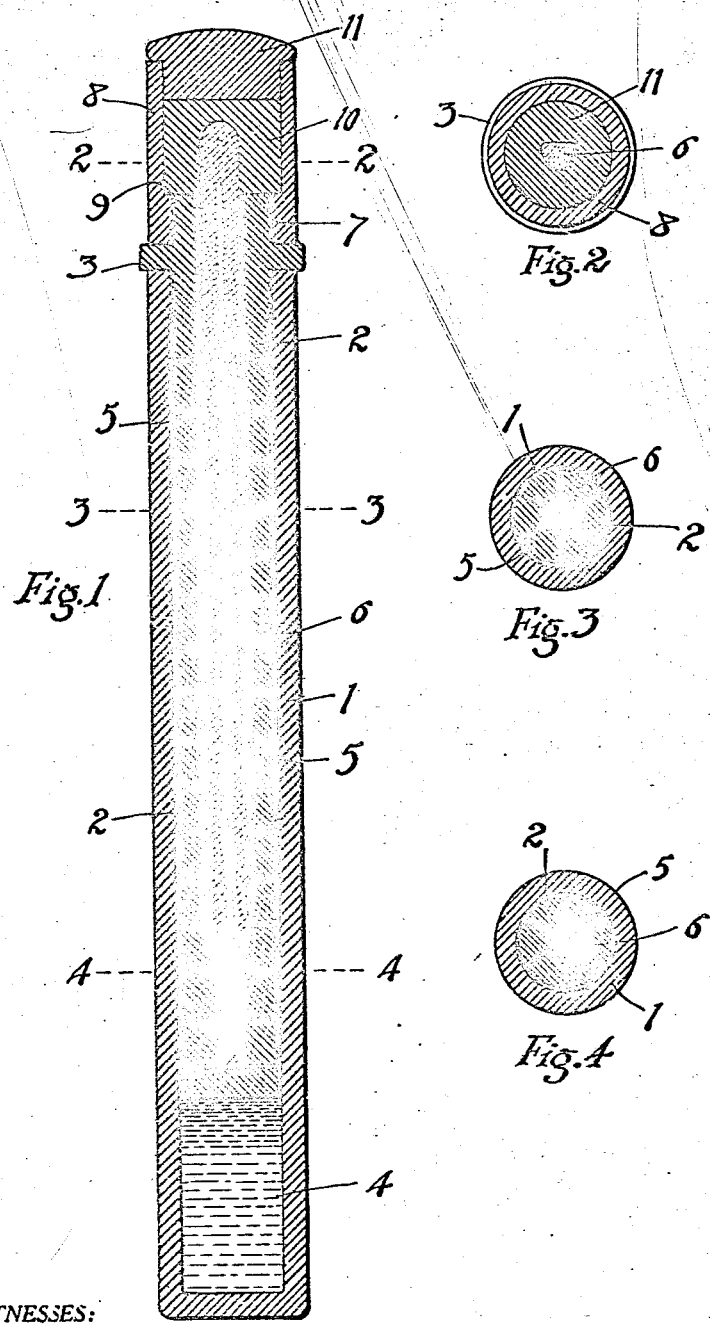

FRANK R. HART, OF SUISUN CITY, CALIFORNIA.

THERMOMETER-CASE.

No. 899,044.   Specification of Letters Patent.   Patented Sept. 22, 1908.

Application filed October 4, 1907. Serial No. 395,890.

*To all whom it may concern:*

Be it known that I, FRANK R. HART, a citizen of the United States, residing at Suisun City, in the county of Solano and State of California, have invented new and useful Improvements in Thermometer-Cases, of which the following is a specification.

The object of the present invention is to provide a clinical thermometer case of cheap and simple construction, which will prevent disease spreading by the conveyance of germs from one person to another, and more effectually than is accomplished at present by the mere washing and wiping of the thermometer after use, which precautions are sometimes neglected.

A further object of the invention is to provide a device of this character which will avoid dripping of the antiseptic liquid from the cap of the case when the thermometer is removed, occasioned by collection of said liquid therein by the case standing inverted for a considerable length of time.

In the accompanying drawing, Figure 1 is an enlarged vertical section of my improved thermometer case, with the thermometer therein; Figs. 2, 3, and 4 are cross sections on the lines 2—2, 3—3, 4—4, respectively of Fig. 1.

Referring to the drawing, the outer tube 1 of the thermometer case is closed at the bottom, and within it is contained the inner tube 2, formed of a hard, tenacious, coherent material, such as rubber. Said tube 2 is screwed into the outer tube at the top and has an annular enlargement or shoulder 3, milled on its outer surface, and resting on the top of the outer tube when the inner tube is screwed into place. The outer tube is sufficiently longer than the inner tube to form a receptacle 4 for an antiseptic liquid.

The inner tube is spaced from the outer tube a minute distance only, such as would cause the antiseptic liquid to ascend between the two tubes by capillarity when the case is erect, and the liquid can pass from the space between the tubes by capillary perforations 5 through the tube 2 to the interior thereof, where it comes in contact with the surface of the thermometer 6.

To charge the case with the antiseptic liquid, the inner tube is unscrewed, the liquid is then supplied, preferably with a dropper, and the inner tube is again screwed into place.

When not in use, the physician should carry the thermometer in an inverted position, which will insure the thermometer being moistened by the liquid, and since the apertures 5 are of capillary dimensions the liquid will not flow out of the liquid receptacle to any considerable extent even although the case is maintained inverted. However, in order to prevent the liquid collecting in said cap by long continued inversion of the case I provide the following construction.

The inner tube 2 is threaded on the outside at the top, as shown at 7, and the case is closed at the top by a screw cap 8. Within said cap is formed, above the screw thread, an annular shoulder 9, and on said shoulder rests a sleeve 10, the outer surface of which is cylindrical, while its inner surface is angular and conformed to fit closely about the thermometer. After inserting the sleeve 10 in the cap, a plug 11 is forced into the cap, completely closing it at the top, which plug is not afterwards removed. Since the sleeve fits closely around the thermometer, no liquid can collect between said sleeve and thermometer. At the same time, although the exterior surface of the thermometer is not circular, but more nearly triangular in cross section, this does nor prevent the cap being unscrewed, for, when it is unscrewed, the sleeve 10 does not have to turn with the cap, but the cap can turn on the sleeve, or the sleeve within the cap relatively to it.

I claim:—

1. A thermometer case comprising an outer tube, an inner tube formed of hard, tenacious and coherent material, and having an inner surface conformed to fit closely against the thermometer when in position, and having therethrough capillary passages for conducting a liquid to said thermometer, said inner tube being screwed at the top within the outer tube, and the bottom of said inner tube being spaced from the bottom of the outer tube to provide a receptacle for a liquid, substantially as described.

2. A thermometer case formed to provide a receptacle for a liquid, also formed with an opening angular in cross section adapted to fit closely around an angular thermometer therein, also formed with capillary passages for conducting a liquid from said receptacle to the thermometer therein, in combination with a cap screwed on said case having a cylindrical inner surface, and an inner sleeve contained within the cap, and freely rotatable therewithin, having a cylindrical outer surface, and an opening angular in cross section conformed to fit closely around an angular thermometer, substantially as described.

3. A thermometer case formed to provide a receptacle for a liquid, also formed with angular inner surface adapted to fit closely around an angular thermometer therein, also formed with capillary passages for conducting a liquid from said receptacle to the thermometer therein, in combination with a cap screwed on said case having a cylindrical inner surface, and an outer sleeve contained within the cap, and freely rotatable therewithin, having a cylindrical outer surface, and an angular inner surface conformed to fit closely around an angular thermometer, said cap being provided with means for permanently retaining said sleeve within said cap, substantially as described.

In testimony whereof I have hereunto set my hand in the presence of two subscribing witnesses.

FRANK R. HART.

Witnesses:
F. M. WRIGHT,
D. B. RICHARDS.